United States Patent [19]

Furuhashi

[11] Patent Number: 5,375,919
[45] Date of Patent: Dec. 27, 1994

[54] ANTI-SKID CONTROL METHOD
[75] Inventor: Shoji Furuhashi, Shizuoka, Japan
[73] Assignee: Nisshinbo Industries Inc., Tokyo, Japan
[21] Appl. No.: 100,214
[22] Filed: Aug. 2, 1993
[30] Foreign Application Priority Data
  Aug. 7, 1992 [JP] Japan .................................. 4-231567
[51] Int. Cl.$^5$ ............................................. B60T 8/32
[52] U.S. Cl. .............................. 303/119.1; 303/116.1; 303/111
[58] Field of Search ...................... 303/113.2, 111, 93, 303/110, 102, 103, 113.3, 105, 106, 108, 109, 91, 100, 104, 96, 116.1, 119.1; 180/197; 188/181 A, 181 C, 181 R; 364/426.03, 426.01

[56] References Cited
U.S. PATENT DOCUMENTS 5,013,096  5/1991  Ocvirk et al. .................... 303/116.1
5,169,213 12/1992  Matsuda et al. .................. 303/113.2

FOREIGN PATENT DOCUMENTS 493153  7/1992  European Pat. Off. ......... 303/116.1
3169769  7/1991  Japan .

Primary Examiner—Douglas C. Butler
Attorney, Agent, or Firm—Nikaido, Marmelstein, Murray & Oram

[57] ABSTRACT

An anti-skid control method for an anti-skid control device comprising two pressure medium lines installed between the master cylinder and the return pathway of the pressure medium with an inlet valve, selector valve, and discharge valve arranged in series in each of the two pressure medium lines, a front wheel brake being connected between the inlet valve and the selector valve of each pressure medium line and a diagonally opposite rear wheel brake being connected between the same selector valve and the discharge valve of that pressure medium line, and a control circuit which controls the front and rear wheel brake pressures through the pressure medium lines. The rotational speeds of each front and rear wheel are determined. The state of traction of each front and rear wheel is judged by the control circuit. The appropriate inlet valve, selector valve, discharge valve and combination thereof are activated to control locking and slippage of each front and rear wheel. In addition, the control circuit opens the inlet valves when the selector valves open to increase the brake pressure of the rear wheels to compensate for the accompanying reduction in pressure of the front wheels.

1 Claim, 5 Drawing Sheets

ANTI-SKID CONTROL METHOD

BACKGROUND OF THE INVENTION

This invention relates to an anti-skid control method which enables proper braking operation.

Anti-skid control devices which decrease, maintain, or increase brake pressure by electronically controlled means to control locking and slipping of the wheels have been developed in recent years.

The present applicant has previously invented an anti-skid control device comprising two pressure medium lines connecting diagonally opposite wheels, wherein three valves are arranged in series in each of the two lines enabling the brake pressures of the front and rear wheels to be separated and controlled independently as set forth in Japanese Unexamined Patent Publication No. 3-169769. In this existing anti-skid control device, there is the danger that increasing the brake pressure to the rear wheels could concomitantly reduce the pressure to the front wheels, resulting in inadequate front wheel braking and deceleration.

OBJECTS AND SUMMARY OF THE INVENTION

The object of the present invention is to provide an anti-skid control method which can accurately control the brake pressure of the front wheels.

The present invention is an anti-skid control method based on an anti-skid control device comprising two pressure medium lines installed between the master cylinder and a return pathway for the pressure medium having an inlet valve, a selector valve, and a discharge valve arranged in series in each of the two pressure medium lines. In each pressure medium line, a front wheel brake hydraulically connected between the inlet valve and the selector valve is connected to a diagonally opposite rear wheel brake hydraulically connected between the same selector valve and the discharge valve. A control circuit controls the front and rear wheel brake pressures through the pressure medium lines. In the present invention, when the selector valves open to increase the brake pressure of the rear wheels, then the inlet valves open to compensate for the accompanying reduction in pressure of the front wheels.

The present invention is uniquely effective as follows: should the rear wheel brake pressure rise, pressure is supplied to the front wheel brakes to prevent that brake pressure from dropping; and braking control required for anti-skid control can be performed with as few as six valves in total.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENT

Figure 1:
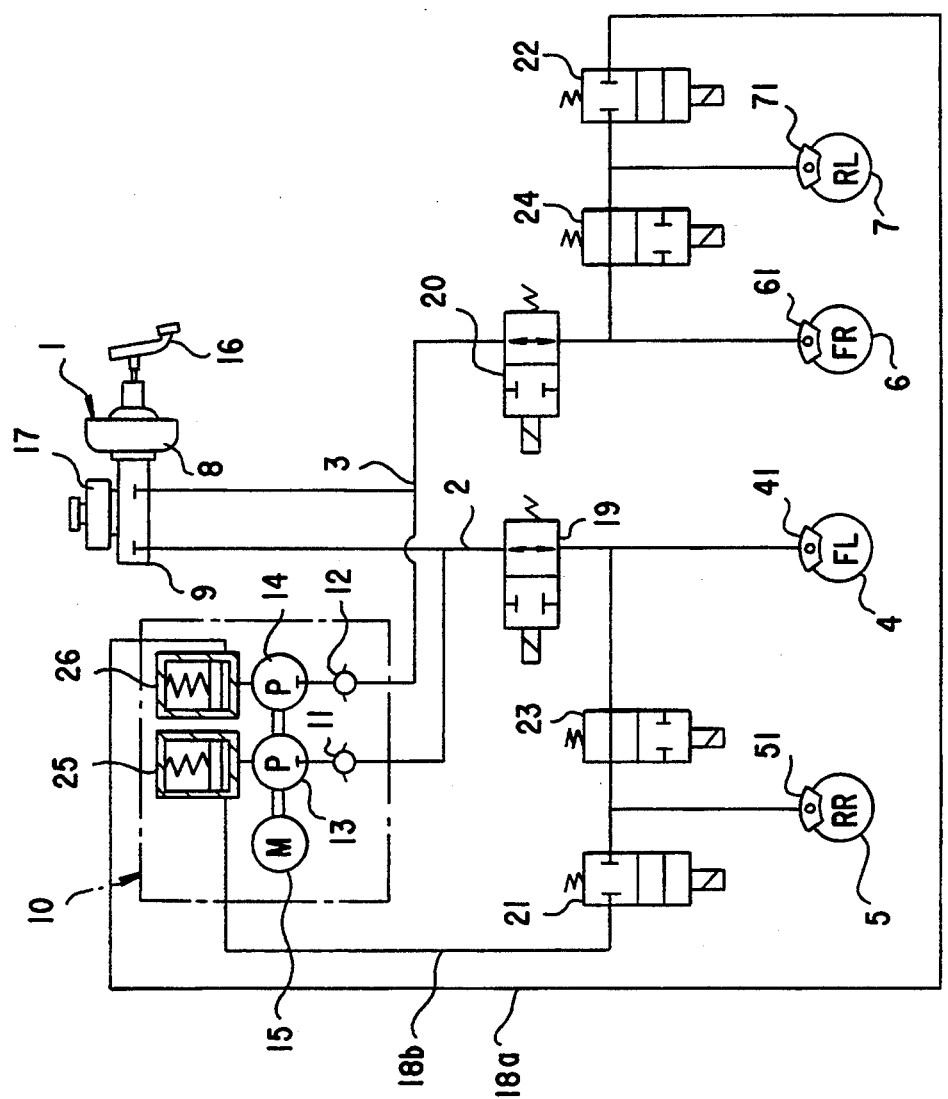
FIG. 1 is a schematic diagram of the pressure medium lines of the anti-skid control device operated in accordance with the present invention.

As shown in FIG. 1, a brake pressure generator 1 includes a power booster 8, a master cylinder 9, and a reservoir 17. The brake pressure generator 1 is connected diagonally to the wheel brake 41 of the left front wheel 4 and the wheel brake 51 of the right rear wheel 5 through a first pressure medium line 2 and to the wheel brake 61 of the right front brake 6 and the wheel brake 71 of the left rear wheel 7 through a second pressure medium line 3. The first and second pressure medium lines 2, 3 are hydraulically separate from one another.

Auxiliary pressure source 10 supplies auxiliary hydraulic fluid to the first and second pressure medium lines 2, 3. The auxiliary pressure source 10 includes first and second check valves 11, 12, first and second hydraulic pumps 13, 14, an electric motor which drives the first and second hydraulic pumps 13, 14, and first and second auxiliary reservoirs 25, 26. The first and second auxiliary reservoirs 25, 26 are connected in first and second return pathways 18b, 18a, respectively, to store the pressure medium and are positioned on the suction side of the respective first and second hydraulic pumps 13, 14 to supply the pressure medium as required.

First and second inlet valves 19, 20, first and second selector valves 23, 24, and first and second discharge valves 21, 22 are connected in series in the respective first and second pressure medium lines 2, 3.

More specifically, the first inlet valve 19 is connected to the master cylinder 9 and to the first check valve 11. The first selector valve 23 is connected to the first inlet valve 19. The first discharge valve 21 is connected between the first selector valve 23 and the return pathway 18b which in turn is connected to the first auxiliary reservoir 25 in the auxiliary pressure source 10.

The second inlet valve is connected to the master cylinder 9 and to the second check valve 12. The second selector valve 24 is connected to the second inlet valve 20. The second discharge valve 22 is connected between the second selector valve 24 and the return pathway 18a which in turn is connected to the first auxiliary reservoir 26 in the auxiliary pressure source 10.

Each of the valves 19–24 is an electromagnetically actuatable two-position/two-way control valve. The first and second inlet valves 19, 20, and the first and second selector valves 23, 24 are normally open during non-activated periods and the first and second discharge valves 21, 22 are normally closed.

Figure 2:
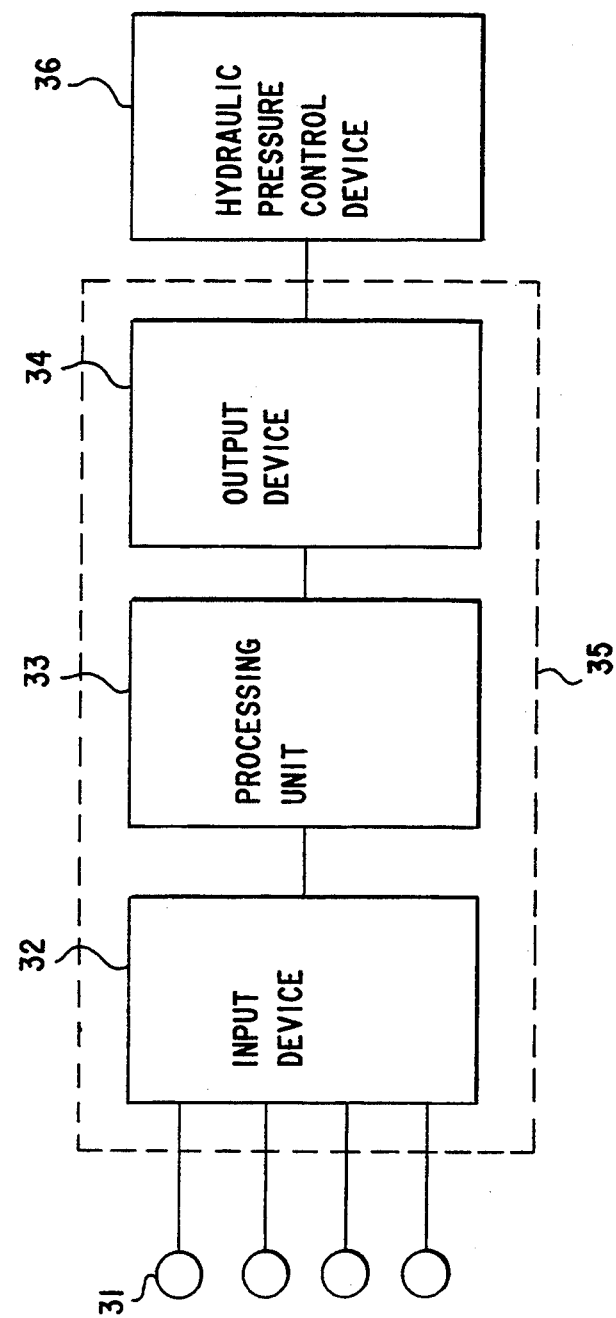
FIG. 2 is a block diagram of the anti-skid control device.

A block diagram of the control system which controls the valves 19–24 is shown in FIG. 2. The control system comprises sensors 31 to measure the rotational speed of each of the wheels and other vehicle parameters, an electronic control device 35 and a hydraulic pressure control device 36. The electronic control device 35 includes input device 32, processing unit 33 to process the anti-skid control signals, and an output device 34.

Figure 3:
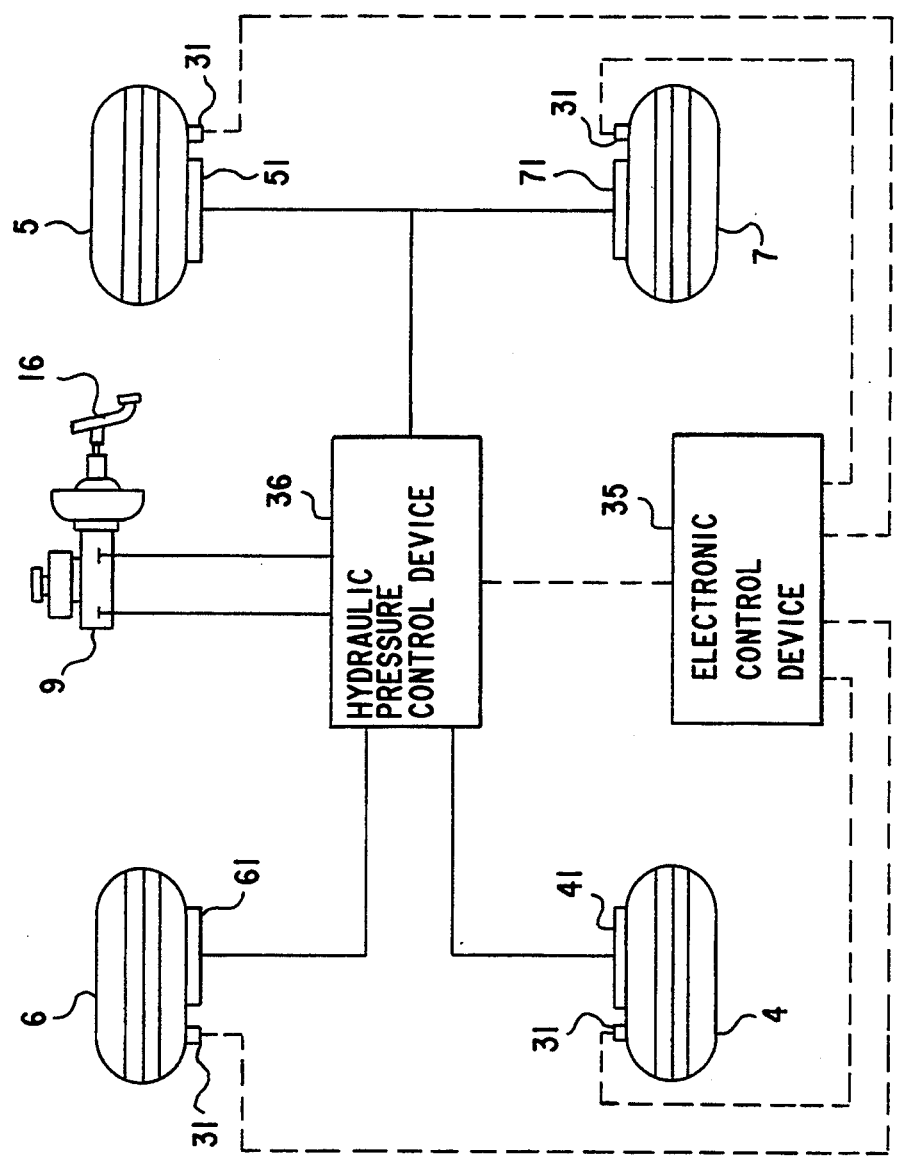
FIG. 3 is a schematic diagram of the anti-skid control device.

As shown in the schematic diagram of FIG. 3, the electronic control device 35 determines the wheel rotational speeds, the estimated vehicle speed and acceleration, and other vehicle parameters based upon signals output by sensors 31 and other sensors attached to each wheel, from which the electronic control device 35 judges the state of traction or lack thereof, of each wheel. The hydraulic pressure control device 36 then opens or closes the first and second inlet valves 19, 20, the first and second selector valves 23, 24, and the first and second discharge valves 21, 22 to regulate the pressure to the wheel brakes 41, 51, 61, 71 as necessary to control locking of the respective wheel.

Each front wheel brake is connected to the diagonally opposite rear wheel brake. More specifically, the wheel brake 41 of the left front wheel 4 is connected to the first pressure medium line 2 between the first inlet valve 19 and the first selector valve 23 while the wheel brake 51 of the right rear wheel 5 is connected to the first pressure medium line 2 between the first selector valve 23 and the first discharge valve 21. The wheel brake 61 of the right front wheel 6 is connected to the second pressure medium line 3 between the second inlet valve 20 and the second selector valve 24 while the wheel brake 71 of the left rear wheel 7 is connected to the second pressure medium line 3 between the second selector valve 24 and the second discharge valve 22. The brake pressure of each rear wheel 5, 7 and the brake pressure of each front wheel 4, 6 are separated by the respective first and second selector valves 23, 24 and therefore can be controlled independently.

Examples of anti-skid control are explained below.

Case I. Anti-skid control where friction resistance of the road surface differs for the left and right wheels.

Figure 4:
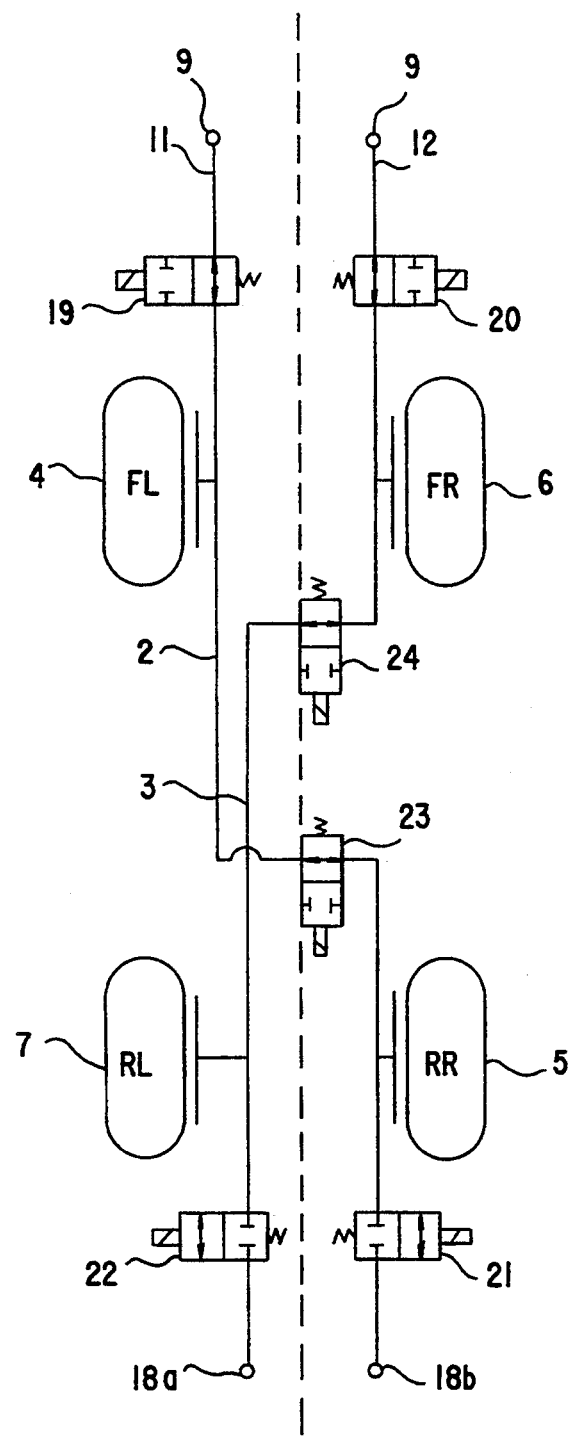
FIG. 4 is a layout diagram of the right and left wheels of a vehicle equipped with the anti-skid device in contact with a road surface of differing friction characteristics.

With reference to FIGS. 3 and 4, when the brake pedal 16 is pressed, pressure generated in the brake pressure generator 1 travels through the pressure medium lines 2, 3 to each of the wheel brakes 41, 51, 61, 71 to brake the front wheels 4, 6 and the rear wheels 5, 7. For the purposes of this example, it is assumed that the left wheels are on an icy surface with a coefficient of friction $\mu$ for the left wheels being 0.2 and the right wheels are on asphalt where the coefficient of friction $\mu$ is 0.8.

In this case, anti-skid control is required to adjust the braking pressure of each wheel and the brake pressure of the side with the lower coefficient of friction in order to secure braking force and operational stability. That is, since the left wheels are on a surface with a low coefficient of friction, if a signal is received that the left front wheel 4 is starting to slip, the first inlet valve 19 closes, and with the first selector valve 23 remaining in its non-activated normally open position, subsequent brake pressure is controlled by the opening and closing of the first inlet valve 19 and the first discharge valve 21. Accordingly, the brake pressure of the right rear wheel 5 connected to the same first pressure medium line 2 is reduced to virtually the same level as the left front wheel 4.

On the other hand, in the second pressure medium line 3 where the right front wheel 6 is on the side which has a high coefficient of friction, slippage of the left rear wheel 7 in contact with the road surface portion with the low coefficient of friction is detected first, whereby since the brake pressure of the right front wheel 6 must be increased, the normally-open second selector valve 24 closes to increase pressure to the right front wheel 6 only. Subsequently, if slippage of the right front wheel 6 is detected, the inlet valve 20 closes to maintain the brake pressure of the right front wheel 6, and the wheel is monitored as to whether traction has been gained or slipping is getting worse. Until the right front wheel 6 does reach a steady pressure state, the second selector valve 24 remains closed, and the brake pressure of the left rear wheel 7 remains Steady as the second discharge valve 22 remains closed. If the left rear wheel 7 continues to slip, then the second discharge valve 22 opens to reduce the brake pressure to that wheel.

However, should the right front wheel 6 continue to slip, then the second selector valve 24 switches to the open position to reduce the brake pressure of the right front wheel 6. In this case, the second discharge valve 22 also opens and closes to regulate the reduction in brake pressure of the left rear wheel 7.

Should the left rear Wheel 7 regain traction and increased pressure be required, the second discharge valve 22 closes, and the second selector valve 24 opens to increase the pressure through the second inlet valve 20.

Thereafter, except in the case where the brake pressure of the right front wheel 6 must be reduced, control of the brake pressure of the right front wheel 6 is controlled by the opening and closing of the second inlet valve 20, and the brake pressure of the left rear wheel 7 is controlled independently by the opening and closing of the second selector valve 24 and the second discharge valve 22.

For effective anti-skid control, it is preferable that the brake pressure of the front wheels be increased, primarily to brake the vehicle, while the brake pressure of the rear wheels be reduced to provide stability, that is, to prevent sideways skidding. This present invention can perform this control with just three valves.

Case II. Control of brake pressure of front and rear wheels.

If the brake pressure of the front wheels 4, 6 is maintained at a steady level, that is, the first and second inlet valves 19, 20 are closed, then the first and second selector valves 23, 24 must be opened in order to increase the brake pressure for the greater braking of the rear wheels 5, 7. In doing so, the brake pressure of the rear wheels 5, 7 will increase, but the brake pressure of the front wheels 4, 6 will decrease. However since the brake mechanisms of the front wheels have larger volume brake cylinders than the brake mechanisms of the rear wheels, i.e. greater "storage capacity", the percentage by which the front wheel brake pressure is reduced is smaller than the percentage by which the brake pressure of the rear wheels is increased. Nevertheless, the amount by which the pressure medium is reduced must be replenished for proper control of the brake pressure of the front wheels 4, 6.

Figure 5A:
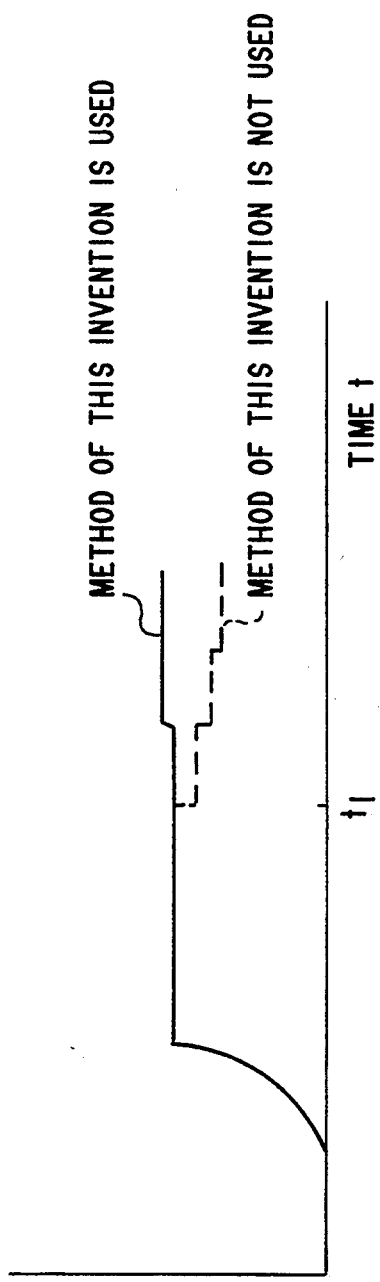
FIG. 5 is a graph showing changes in the brake pressures of the front and rear wheels using the present invention compared with not using it.
Figure 5B:
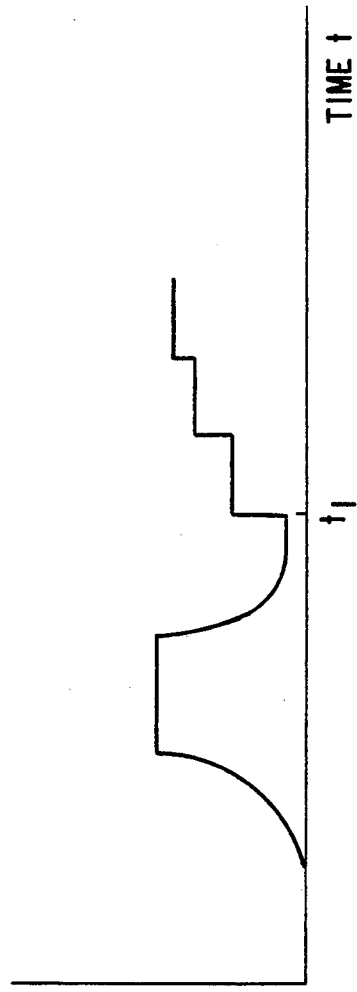

For example, as shown in FIG. 5, if the method of the present invention is not used and if the brake pressure of the rear wheels is increased from time t1 (FIG. 5B), then the brake pressure of the front wheels is reduced slightly as shown by the broken line in FIG. 5A. In order to replenish the amount by which the pressure is reduced as shown by the broken line, the first and second inlet valves 19, 20 are opened as long as necessary to replenish the pressure medium of the front wheel brakes and set the brake pressure as shown by the solid line of FIG. 5A.

In special cases where the brake pressures of both the front wheels and the rear wheels must be increased simultaneously, as the pressure medium is supplied as necessary to the front wheel brakes, the required amount of the pressure medium is also injected to the rear wheel brakes from the first and second inlet valves 19, 20 and the supply is regulated until ultimately the front wheel brake pressures reaches the specified value.

Given the control procedures as described, the method of this invention enables accurate control of the brake pressure of the front wheels and simultaneous control of the brake pressure of the rear wheels.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What I claim is:

1. An anti-skid control method comprising the steps of:

providing an anti-skid control device comprising two pressure medium lines installed between a master cylinder and a return pathway of a pressure medium, each pressure medium line including an inlet valve, a selector valve, and a discharge valve arranged in series, a front wheel brake being connected between the inlet valve and the selector valve and having a front wheel brake pressure, and a diagonally opposite rear wheel brake being connected between the selector valve and the discharge valve and having a rear wheel brake pressure, and a control circuit which controls the front and rear wheel brake pressures through the two pressure medium lines by activating the inlet valves, selector valves and discharge valves as needed;

determining rotational speeds of each front and rear wheel;

judging a state of locking and slipping of each front and rear wheel; and activating the inlet valve, selector valve, discharge valve and combination thereof of the pressure medium lines as appropriate to control locking and slippage of each front and rear wheel;

wherein the step of activating includes opening the inlet valves whenever the selector valves open to increase the brake pressure of the rear wheels to compensate for an otherwise accompanying reduction in pressure of the front wheels.

* * * * *